Aug. 2, 1938.  G. D. YOAKUM  2,125,598
TIRE CHAIN
Filed April 10, 1936
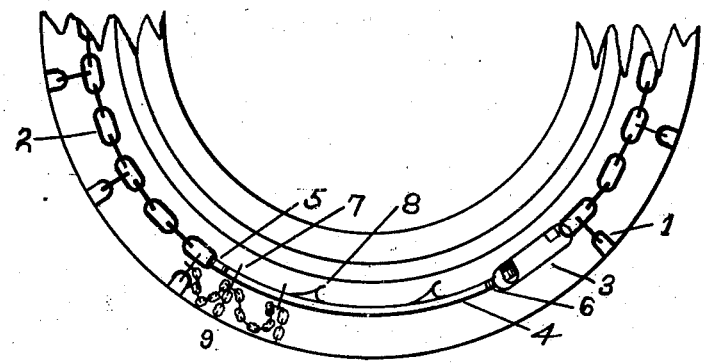
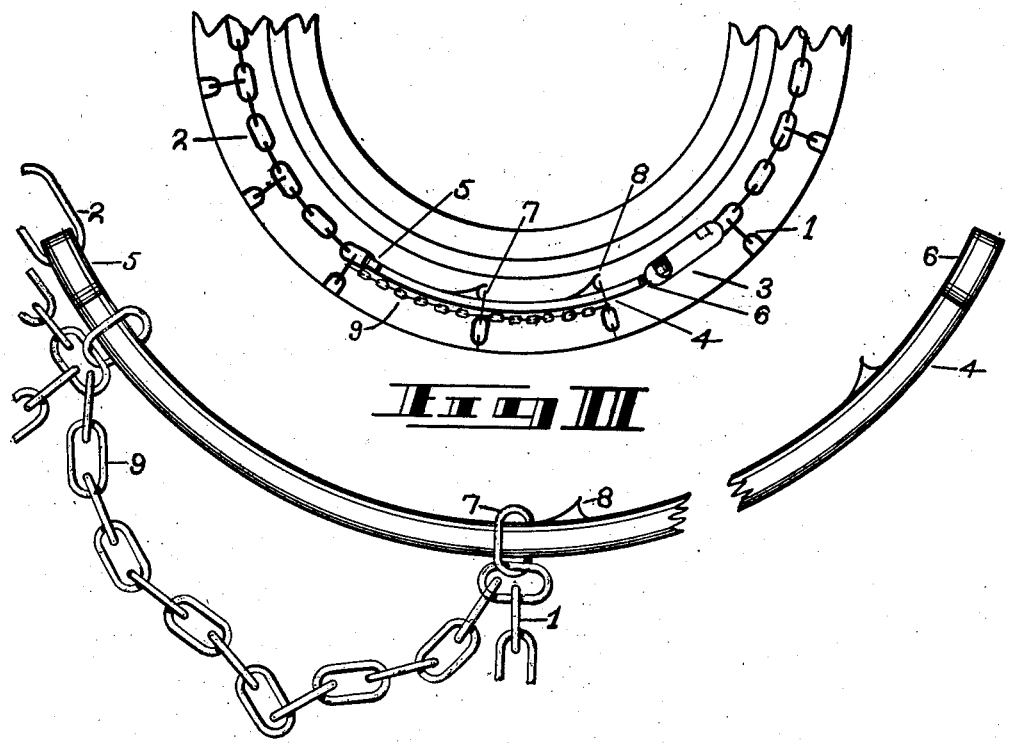
INVENTOR.
Guy D. Yoakum
BY Lyman C. Conger
ATTORNEY Patented Aug. 2, 1938

2,125,598

UNITED STATES PATENT OFFICE 2,125,598

TIRE CHAIN

Guy D. Yoakum, Sturgeon Bay, Wis.

Application April 10, 1936, Serial No. 73,611

5 Claims. (Cl. 152—213)

My invention relates to improvements in tire chains of a type adaptable for use on automobile wheels.

Such chains are a well recognized means of providing additional traction upon muddy, icy or snowy surfaces and, once attached, perform this function satisfactorily. They are subject, however, to the disadvantage that they are difficult to attach, it being necessary to jack or raise the wheel or to roll it in order to attach them. They are, therefore, not suited to emergency use since when an automobile becomes stalled under conditions where chains would be of assistance it is ordinarily impossible to find a firm surface which will support a jack or to raise the wheel sufficiently to allow the links of the chain which are normally beneath the wheel to be slid under the wheel sufficiently to allow attachment of the chain and it is likewise impossible to roll the wheel sufficiently to permit attachment of the chain. Furthermore, the attachment of a chain in the ordinary manner requires reaching under the fenders and running gear of the automobile and almost inevitably results in the soiling of the person and clothing of the one making the attachment.

It is an object of my invention to obviate the aforementioned difficulties by providing an improved tire chain in which certain of the cross chains are capable of displacement to permit the attachment of the chain without raising or rolling the wheel and which may be attached without reaching under the fenders or running gear of the automobile. It is a further object of my improvement to provide attaching means which will accomplish the foregoing purposes yet constitute an integral part of the chain.

I accomplish the foregoing and other collateral objectives by the use of the construction illustrated in the accompanying drawing, in which—

Figure 1 is a side view of an automobile wheel showing my improved chain in an initial position of attachment; Figure 2, a similar view showing the chain in the final position of attachment and Figure 3, a detail view of the connecting rod forming a portion of the invention.

Similar numerals refer to similar parts throughout the several views.

In the practice of my invention the tire chain comprises the cross-chains 1, side chains 2 and securing clamps 3, the latter attached at one extremity of the side chains 2 as illustrated. The side chains are attached to the cross chains 1 in such manner that the latter are substantially equally spaced from adjacent cross chains in the normal position. These elements are all of conventional design except that the side chains 2 are shorter than the circumference of the wheel so that, when the chain is applied to the wheel the extremities of the side chains 2 do not meet and that a portion of the cross chains, those normally underneath the wheel in the position of attachment of the chain, are capable of displacement to vary their spacing as hereinafter more fully described.

A non-flexible connecting rod 4, formed in an arc of the same radius as that of the intermediate portion of the tire, is interposed between the clamp 3 and the opposite extremity of the side chains 2. The rod 4 is formed at the one extremity into a loop 5 through which a link of the side chain 2 extends to form a connection between the side chain and the rod, and at the other extremity into a similar loop 6, adapted to be engaged by the clamp 3.

Two or more of the links 1 which are provided with connecting chains 9 are secured to the connecting rod by means of the encircling rings 7 thus having a slidable connection with the rod. The rod 4 is provided with an equivalent number of stops 8 which allow the rings 7 to pass over them in the direction of the loop 6 but prevent said rings from passing over them in the opposite direction when the chain is attached, the rings however being capable of manual removal from the stops so that they may be slid back in the direction of the loop 5.

If the spacing of the cross chains 1 is unusually wide it may suffice to have only one of the cross chains so attached, it being necessary only that the cross chains which would occupy a position under the wheel when the chain is being attached thereto be so attached to the side chain.

The method of attachment of the chain is as follows: The cross chains 1, and the accompanying portion of the side chain 2, which are secured to the rod 4 are slid backward upon the rod in the direction of the loop 5, as shown in Figure 1. The chain is then placed over the wheel and the rods 4 connected to the clamps 3. It will be noted that, since the cross chains which would normally be under that portion of the wheel which engages the ground are displaced, the chain may be attached without raising the wheel from the ground. Thus the chain may be attached even though the automobile is stalled in a muddy, icy or snowy situation. Furthermore, the displacement of the links does not seriously detract from the efficiency of the chain and does not injure the automobile or tire, therefore the automobile may be driven with the chain in this position, in fact, it is contemplated that, in case the chain is applied while the automobile is stalled, it will be so driven, at least until it has been extricated.

When the automobile has been driven a sufficient distance to cause the rod 4 to assume a position near the top of the wheel, the rings 7 may be slid forward over the stops 8, as shown in Figure 2, in fact, it will be found that the forces exerted on the chain by the movement of the automobile will sometimes cause it to assume this position without further adjustment. The chain will be held in this position by the stops 8 until again manually adjusted for the purpose of attachment.

The rod 4, being non-flexible, may readily be pushed through inside the wheel and grasped on the opposite side so that it is unnecessary to reach under the fenders or running gear of the automobile to grasp the chain, thus obviating the soiling of the person and clothing. Since it is the portion of the chain which is inside the wheel which is most difficult to grasp I prefer to make the rod 4 of greater length on the inside of the wheel, for example the inside rod extending the length of three cross chains and the outermost rod the length of two cross chains. The exact length of the rods is however a matter of choice, it being necessary only that the length be sufficient to allow displacement of the cross chains which would normally be underneath the wheel.

It will also be noted that all the attaching mechanism constitutes an integral part of the chain and that there are no attachments, attaching tools or other separate parts to become lost or mislaid. The rod 4 does not interfere with the functioning of the chain or injure the tire of the automobile and may be made of such size and color as not to be unsightly in appearance.

It will also be noted that the improvement may be incorporated in chains already manufactured as well as those to be newly fabricated.

Although I have described the rod 4 as being non-flexible, that being the preferred form, it will be obvious that, if it is desired to dispense with the advantage of being able to grasp the chain readily without soiling the person or clothing, the rod may be made flexible or the rings 7 may be attached directly to the side chains 8, such constructions being an equivalent of that disclosed.

It will be obvious to those skilled in the art that other and further variations in the specific construction herein described and illustrated may be made without the exercise of invention and I do not limit myself to said specific construction but claim all constructions within the spirit of my invention and the scope of the appended claims.

I claim:

1. A tire chain of a type comprising a pair of side chains and a plurality of cross chains, characterized by slidable connections between one or more of said cross chains and said side chains whereby to permit displacement of said cross chains from their normal positions and by means for holding said cross chains in their normal positions, said cross chains being capable of manual disengagement from said holding means whereby to permit displacement of said cross chains.

2. A tire chain of a type comprising a pair of side chains and a plurality of cross chains, characterized by non-flexible extensions of said side chains and slidable connections between said extensions and one or more of said cross chains and by stops positioned on said extensions and adapted to engage said slidable connections, said connections being capable of manual disengagement from said stops whereby to permit sliding movement of said cross chains.

3. A tire chain of a type comprising a pair of side chains and a plurality of cross chains normally substantially equally spaced along said side chains, characterized by the fact that one or more of said cross chains are capable of relative displacement whereby to vary the spacing of said cross chains and by means for holding said cross chains equally spaced, said cross chains being capable of disengagement from said holding means whereby to permit relative displacement of said cross chains.

4. A tire chain comprising a side chain, a plurality of cross chains attached thereto, a clamp attached to one extremity of said side chain, a connecting rod attached to the opposite extremity of said chain and adapted to be attached to said clamp, a connecting chain adapted to be positioned parallel to said connecting rod, a plurality of cross chains attached thereto, slidable connections between said second-mentioned cross chains and said connecting rod comprising rings encircling said connecting rod and links of said connecting chain and stops on said connecting rod adapted to engage said rings, said rings being capable of manual disengagement therefrom.

5. A tire chain comprising a side chain, a plurality of cross chains attached thereto, a connecting rod attached at one extremity to said side chain, means for attaching said side chain to the opposite extremity of said connecting rod, a connecting chain adapted to be positioned substantially parallel to said connecting rod, one or more cross chains attached thereto, slidable connections between said second-mentioned cross chains and said connecting rod comprising rings encircling said connecting rod and links of said connecting chain and stops on said connecting rod adapted to engage said rings, said rings being capable of manual disengagement therefrom.

GUY D. YOAKUM.